2,973,328

DENNING SULFATED KAOLIN IN STREAM OF GAS COMPRISING STEAM

Gerhardt Talvenheimo, Chester, Pa., assignor to Houdry Process Corporation, Wilmington, Del., a corporation of Delaware No Drawing. Filed Jan. 30, 1956, Ser. No. 561,996

2 Claims. (Cl. 252—450)

The present invention relates to the activation of clays and is particularly concerned with the preparation therefrom of catalysts of desired physical strength having enhanced activity for cracking and other catalytic conversion of hydrocarbons.

Conventional methods in commercial use for preparing catalysts of desired activity as well as useful decolorizing agents from sub-bentonite clays of the montmorillonite family involve leaching of the clay with aqueous mineral acid at about 200° F., thereby effecting removal of a portion of the alumina content of the clay and simultaneous removal of part of the acid-soluble undesirable components therefrom such as iron and alkali metal compounds. This procedure has also been applied in the attempted activation of clays of the kaolin family, but catalysts having the desired stable activity and other properties required for commercial adoption in existing catalytic cracking processes have not generally been obtained thereby.

It has also been proposed to activate natural mineral products including clays of the kaolin as well as those of the montmorillonite class by incorporating therein acid reacting materials and subjecting the admixture to roasting for effecting reaction between the acid and components of the mineral, followed by washing to remove soluble conversion products thus formed (U.S. Patent 2,582,956 of January 22, 1952).

Methods for activation of clays using liquid sulfuric acid are also known in which the raw clay is mixed with concentrated $H_2SO_4$ followed by aging or denning at elevated temperature to complete the sulfation reaction; the sulfated clay being then mixed with water to effect dissolution of soluble sulfates. It has also been proposed to subject sulfated clays to thermal decomposition at temperatures in excess of 1100° F. followed by treatment with acid solvent to remove alumina and other acid soluble components leaving a residue composed largely of silica.

By the method of the present invention, moreover, even raw kaolin clays of initially poor plasticity can be formed into granules and pellets having high resistance to crushing, abrasion and attrition, and even such raw kaolin clays, which are not brought to acceptably high catalytic activity levels by the usual or known methods of acid treatment, when processed in accordance with the present invention produce catalysts of satisfactory performance characteristics retaining their activity in use over a long period.

The desired contact masses of the present invention are prepared by subjecting a sulfated kaolin to denning at an elevated temperature, with a gas comprising steam, such as pure steam or air saturated with steam. In particular, the process of the present invention contemplates steam denning a sulfated kaolin at a temperature of between 250° F. and 350° F. When air saturated with steam mixtures are used, the preferred temperature range comprises from 190° F. to 210° F. wet bulb and 250° F. to 350° F. dry bulb. Preferably, the steam denning is continued for a period of from 2 to 12 hours.

It is believed that coke formation is promoted, when hydrocarbons are cracked by contact with sulfated kaolin catalysts, by the presence in such catalysts of free alumina (uncombined and aggregated) formed from crystallized aluminum sulfate hydrate produced from sulfuric acid and kaolin during denning.

The process of the present invention yields a glassy non-crystalline aluminum sulfate water complex, which complex is amorphous to X-rays and shows no crystallite formation. The contact masses of the present invention when used as catalysts in the cracking of hydrocarbons are superior to other kaolin catalysts in that, when compared with kaolin catalysts at a like level of cracking activity, they possess a relatively low tendency to produce coke and carbonaceous contaminants.

Catalysts of the present invention have comparable or better physical and catalytic properties than catalysts prepared by oil denning a sulfuric acid treated kaolin, in particular, a higher density, and substantially lower gas makes and coke makes at equivalent gasoline yields. It is possible to produce the catalysts of the present invention utilizing substantially one-half the amount of sulfuric acid required to produce similar catalysts through the oil denning treatment of sulfated kaolins. Moreover, unlike oil-denned catalysts it is not necessary to remove, as by oxidation, the residual oil impregnated into the catalyst during oil denning.

Various methods are available for the initial preparation of the sulfated clay. A simple but practicable technique involves grinding of the raw clay—preferably after washing and desilting to remove physically admixed non-clay materials—thereafter subjecting the same to thorough mixing with sulfuric acid, using a quantity of acid sufficient at least to react with part of the alumina content of the clay. The mixing of the clay and acid may be done in a pug mill, or the materials may be previously admixed and the acid thoroughly incorporated with the clay in a pug mill or other suitable mixing device.

The acid serves to convert a portion of the alumina content of the clay to aluminum sulfate which forms a firm binder between the remaining clay particles. Subsequent decomposition of the sulfate does not destroy this bond so that physically strong pellets or other firm aggregates result. The bonding effect of the sulfation is evidenced with as little as 10% $H_2SO_4$ or less to the dry weight of the clay and with increasing quantities of acid, more alumina is reacted with accompanying tendency to produce stronger pellets up to the stoichiometric equivalent of the alumina. In general it is preferred to employ a quantity of acid furnishing 20 to 80 weight percent of $H_2SO_4$ to the dry weight of the clay. As above noted, the sulfuric acid requirements of the catalysts of the present invention are appreciably below those necessitated for oil-denned catalysts, and in operation of the sulfation step moderately to highly concentrated acid may be employed as from about 30% aqueous sulfuric acid up to 100% concentrated acid. By proper selection of the quantity and concentration of acid, an acid-clay mix of desired extrusion consistency can be provided which does not require any further adjustment of liquid content prior to extrusion. Thus, with typical kaolin clays this generally can be accomplished by mixing the clay with about 30 to 40 weight percent liquid by weight of dry clay. If the total liquid content provided by the acid employed results in too stiff a mix, it will be understood, that additional quantities of water may be added to adjust the mix to desired extrudable consistency.

After thorough mixing of the clay and acid to form a composition of extrudable consistency, the mix is extruded through die plates having orifices of desired size and the extruded strands are cut or broken to desired lengths. Conventional finished clay catalyst pellets, after calcination, are generally cylindrical and of about 2 to 6 millimeters diameter and of about the same length. The wet pellets are accordingly produced so as to fall in the desired size range on subsequent treatment which includes drying and calcination.

While extrusion has been particularly described as a convenient manner of producing the desired hard catalyst pellets, it will be understood that other methods of pelleting might be employed including casting, compacting, prilling or other known techniques used in tablet and pellet formation. The catalyst may be formed into other than cylindrical pellets, such as discs, rings, spheres, or other desired shapes.

To complete the reaction between the acid and the clay, the formed pellets are denned with a gas comprising steam, such as air saturated with steam at a wet bulb temperature of from 190° F. to 210° F., and a dry bulb temperature of from 250° F. to 350° F., or steam alone at a temperature of 250° F. to 350° F. for from about 2 to 12 hours.

The sulfated clay pellets are now ready for the desulfation treatment which may be accomplished in any one of a number of ways but not necessarily with equal results. In the preferred practice desulfation is effected at temperatures above 750° F. and in the presence of a reducing agent which converts the sulfate radical, or the $SO_3$ released therefrom at the elevated temperature, to a lower oxide of sulfur, which is driven off. Reducing agents that can be employed for this purpose include gases or vapors such as hydrogen, carbon monoxide, hydrogen sulfide, sulfur, ammonia, methane. Not all of these are equally effective under the same temperature conditions. Hydrogen sulfide, for example, works effectively at a minimum temperature in the order of 750° F. to 800° F. while methane requires a considerably higher temperature in the order of 1400–1450° F. All of the other named reducing agents are effective at a minimum temperature between 1000 and 1400° F. Desulfation may be carried out in the absence of reducing agent, and particularly in an atmosphere containing over 10% steam, but thermal desulfation does not proceed at a reasonably rapid rate below 1500° F., requires considerably greater heat input, and is difficult to control because of the possibility of inducing an exothermic reaction, such as in crystal transformation, which might take place at these high temperatures.

The manner of carrying out the desulfation is important from the standpoint of the ultimate physical and catalytic properties of the finished catalyst pellets. Thus, it has been found that the presence of steam during the reduction or other decomposition of the sulfate in the clay results in the production of catalyst of reduced coking tendency; that is, the catalyst thus obtained shows comparatively better gasoline/coke ratios in hydrocarbon cracking under conventional operating conditions than similarly prepared kaolin catalysts in which steam is not employed. As a possible alternative the decomposition of the sulfate particularly by reduction, might be carried out in the absence of steam, and the desulfated clay then subjected to steaming at a temperature above about 1000° F. to about 1550° F. or short of that which would cause initiation of sintering of the clay. This subsequent steaming step also tends to reduce the coking tendency of the catalyst but it is nevertheless preferred to employ steam during the decomposition of the sulfate, not only because of convenience of operation, but also because repeated production of catalysts of lowest coking tendency is thus better assured.

In the preferred operation, desulfation of the sulfated kaolin pellets is carried out at temperatures in the range of 1100–1600° F., better at 1350° F. or above, employing a reducing gas mixture composed of steam and hydrogen. At temperatures of 1300° F. and above the gas may contain as little as 1 mol percent hydrogen and be effective. At lower temperatures, higher concentrations of reducing agent in the gas mixture are required. Instead of or in addition to the hydrogen, carbon monoxide may be employed in about the same total ratio in the mixture of reducing gas to steam as hereinbefore described in the case of hydrogen alone. Carbon monoxide alone is less efficient than hydrogen at temperatures below 1200° F.

When hydrogen sulfide is used as the reducing gas, with or without the simultaneous presence of steam, lower temperatures are effective from about 750° F. To assure the production of catalysts of low coking tendencies, however, with perhaps some gain in catalyst activity, the desulfated clay should be subjected to a subsequent steaming operation at temperatures above 1350° F. and preferably at 1500–1600° F.

When hydrogen sulfide is employed at temperatures of 1050° F. or higher any iron present in combined form in the clay lattice may be freed and thereby activated. In such case it is best to remove the liberated iron, which can be readily accomplished by treatment with $NH_4Cl$ vapor.

In general whenever reduction is carried out in the absence of steam, the subsequent steaming should be carried out at above 1350° F. and preferably in the 1400–1600° F. temperature range using 100% steam or steam diluted with up to about 70–80% inert gas.

As indicated above, decomposition of the sulfate can be effected in a steam atmosphere without reducing agents if at sufficiently high temperature, but not necessarily with equal facility or effectiveness as when using reducing agents.

On the reduction process of decomposing sulfate the initial reaction illustrated in Equation I below is endothermic; the second stage Reaction II is exothermic.

(I) $\quad\quad\quad Al_2(SO_4)_3 \rightarrow Al_2O_3 + 3SO_3$ (II) $\quad\quad\quad 3SO_3 + 3H_2 \rightarrow 3SO_2 + 3H_2O$ Hence, once the reaction illustrated in Equation II has been initiated, the reduction of the $SO_3$ supplies at least a part of the heat required to further decomposition of the aluminum sulfate.

EXAMPLE I (PREPARATION OF CONTROL CATALYST)

A Georgia clay was sulfated by treatment with 66° Bé. acid, extruded to pellets, and oil denned at about 300° F. for four hours. The sulfated catalyst contained 36.8% by weight (on 105° C. dry sulfated clay basis) $H_2SO_4$, showed a total ignition loss of 50.8% (at 1800° F. for 2 hours) and contained 64.1% of $SO_3$ measured on an ignited basis.

The above clay was desulfated by treatment at 1350° F. for four hours in 10% $H_2$ and 90% steam. The properties of the catalyst obtained are summarized in the table below:

Table 1

Physical properties:
  Surface area sq. m./g _____ 145
  Bulk density kg./l _____ 0.78

The catalytic behavior of the above catalyst was determined by the standard CAT-A method (see "Laboratory Method for Determining the Activity of Cracking Catalysts," by J. Alexander and H. G. Shimp, page R537, National Petroleum News, August 2, 1944) in cracking of a light gas oil at standardized conditions, with the following results:

Gasoline vol. percent charge _____ 36.2
Coke wt. percent charge _____ 4.0
Gas wt. percent charge _____ 8.7
Gas gravity (air=1) _____ 1.41

EXAMPLE II

A similar kaolin to that employed in Example I was sulfated so as to contain 19.6 percent by weight (on 105° C. dry sulfated clay basis) $H_2SO_4$. The aforesaid contact mass was steam denned for 4 hours at 210° F. wet bulb and 270° F. dry bulb.

The above clay was desulfated by treatment at 1,350° F. for four hours in 10% hydrogen and 90% steam. The properties of the catalyst obtained are summarized in the table below:

*Table 2*

Physical properties:
- Surface area sq. m./g. _____ 51.5
- Bulk density kg./l. _____ 0.888

The catalytic behavior of the above catalyst was determined by the standard CAT-A method with the following results:

- Gasoline vol. percent charge _____ 29.2
- Coke wt. percent charge _____ 1.9
- Gas wt. percent charge _____ 4.5
- Gas gravity (air=1) _____ 1.27

EXAMPLE III

A kaolin similar to that of Examples I and II was sulfated with sulfuric acid and contained 20.0 percent by weight (on 105° C. dry sulfated basis) $H_2SO_4$. The aforesaid contact mass was steam denned for 8 hours at 210° F. wet bulb and 270° F. dry bulb.

The above clay was desulfated by treatment at 1,350° F. for four hours in 10% $H_2$ and 90% steam. The properties of the catalysts obtained are summarized in the table below:

*Table 3*

Physical properties:
- Surface area sq. m./g. _____ 65.6
- Bulk density kg./l. _____ 0.886

The catalytic behavior of the above catalyst was determined by the standard CAT-A method with the following results:

- Gasoline vol. percent charge _____ 31.6
- Coke wt. percent charge _____ 2.5
- Gas wt. percent charge _____ 5.9
- Gas gravity (air=1) _____ 1.38

EXAMPLE IV 500 grams of kaolin clay were mixed with 195 milliliters of 93.2% sulfuric acid for 15 minutes and extruded and pelleted. The sulfated kaolin containing 38.8% by weight (on 105° C. dry sulfated clay basis) $H_2SO_4$ was denned with steam saturated air for four hours at a wet bulb temperature of 208° F. and a dry bulb temperature of 270° F.

The above clay was desulfated by treatment at 1,350° F. for four hours in 10% hydrogen and 90% steam. The properties of the catalyst obtained are summarized in the table below:

*Table 4*

Physical properties:
- Surface area sq. m./g. _____ 112
- Bulk density kg./l. _____ 0.614

The catalytic behavior of the above catalyst was determined by the standard CAT-A method with the following results:

- Gasoline vol. percent charge _____ 32.5
- Coke wt. percent charge _____ 2.4
- Gas wt. percent charge _____ 6.3
- Gas gravity (air=1) _____ 1.30

EXAMPLE V

A sulfated catalyst containing 40.5% by weight (on 105° C. dry sulfated clay basis) $H_2SO_4$ was denned for four hours in dry air at 300° F. and then denned for an additional twelve hours with steam-saturated air having a wet bulb temperature of 208° F. and a dry bulb temperature of 270° F.

The above clay was desulfated by treatment at 1,350° F. for four hours in 10% hydrogen and 90% steam. The properties of the catalyst obtained are summarized in the table below:

*Table 5*

Physical properties:
- Surface area sq. m./g. _____ 116.0
- Bulk density kg./l. _____ 0.702

The catalytic behavior of the above catalyst was determined by the standard CAT-A method with the following results:

- Gasoline vol. percent charge _____ 32.1
- Coke wt. percent charge _____ 2.9
- Gas wt. percent charge _____ 6.1
- Gas gravity (air equals 1) _____ 1.25

The present invention may be embodied in other specific forms without departing from the spirit or essential attributes thereof and, accordingly, reference should be made to the appended claims, rather than to the foregoing specification as indicating the scope of the invention.

What is claimed is:

1. The method of preparing pellets of active cracking catalyst from kaolin clay which method consists essentially of: impregnating kaolin clay with sulfuric acid amounting to from about 20% to about 80% by weight of the dry clay to prepare a plastic mixture; forming the plastic mixture of kaolin clay and sulfuric acid into pellets; denning the pellets of kaolin clay and sulfuric acid in a gas containing an amount of steam corresponding to saturation with steam at a temperature not lower than 190° F., said denning being conducted at a temperature between about 250° F. and 350° F. for a period of from about 2 to about 12 hours to bring about the reaction between the sulfuric acid and the kaolin clay to modify the pellets; and desulfating the denned pellets by treatment with a mixture of reducing gas and steam at a temperature in the range from about 750° F. to 1600° F. to volatilize the oxides of sulfur therein.

2. The method of preparing pellets of active cracking catalyst from kaolin clay which consists essentially of: treating kaolin clay with sulfuric acid to prepare a mixture of kaolin clay and sulfuric acid containing sulfuric acid constituting about 40% of the clay; extruding said mixture of clay and acid to form pellets; denning the pellets for about four hours in a mixture of air and steam having a dry bulb temperature of about 270° F. and a wet bulb temperature of about 208° F.; and desulfating the denned pellets by treatment for about four hours in a mixture of about 10% hydrogen and 90% steam at about 1,350° F.

References Cited in the file of this patent

UNITED STATES PATENTS

| | | |
|---|---|---|
| 1,492,184 | Weir et al. | Apr. 29, 1924 |
| 1,739,734 | Raine et al. | Dec. 17, 1929 |
| 2,090,741 | Zublin | Aug. 24, 1937 |
| 2,192,000 | Wilson | Feb. 27, 1940 |
| 2,430,289 | Gary | Nov. 4, 1947 |
| 2,485,626 | Mills | Oct. 25, 1949 |

FOREIGN PATENTS

| | | |
|---|---|---|
| 239,169 | Great Britain | July 6, 1926 |